Figure 1:
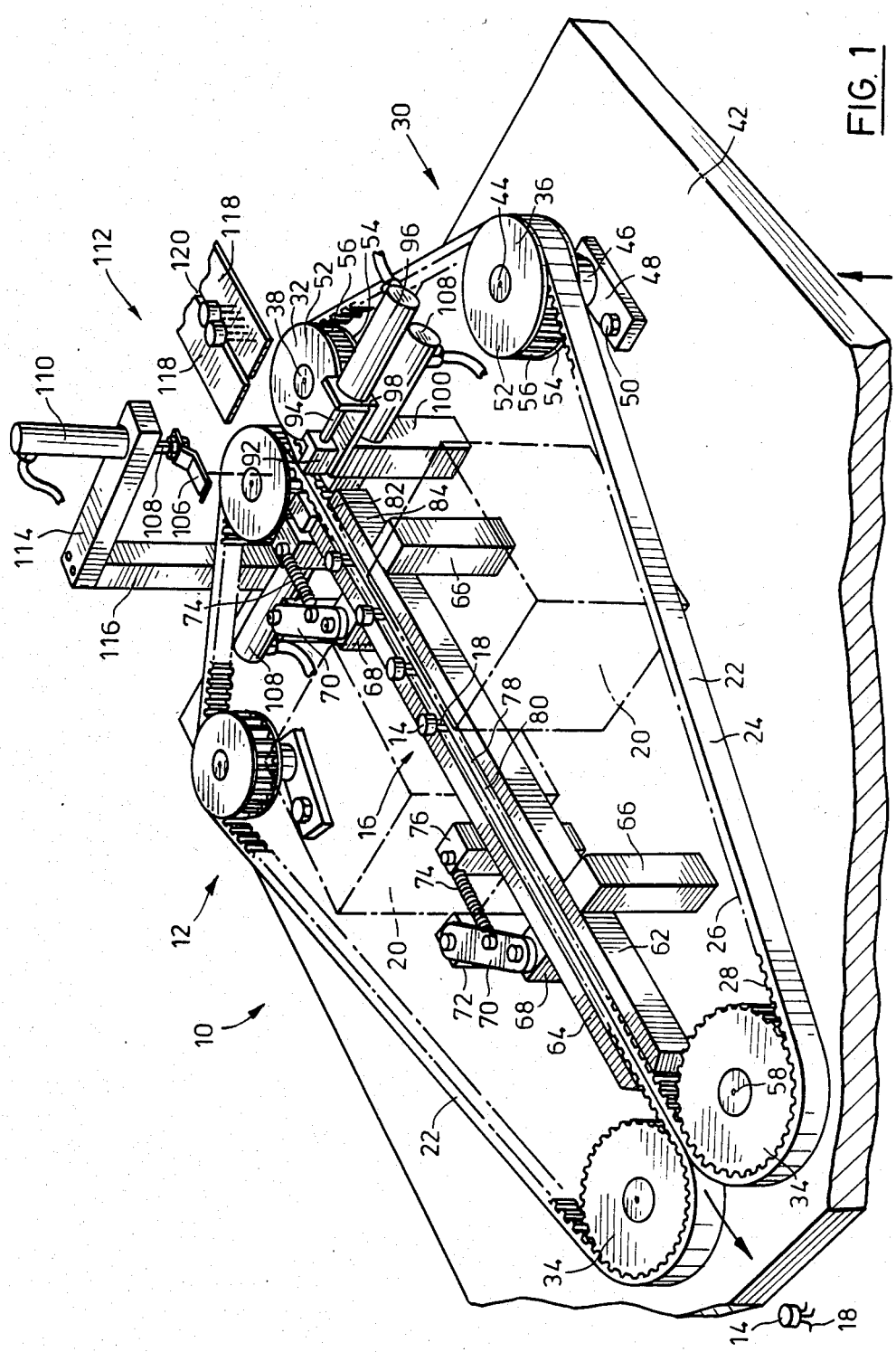

United States Patent [19]

Storimans

[11] Patent Number: 4,650,060

[45] Date of Patent: Mar. 17, 1987

[54] FEED CONVEYOR FOR MACHINE FOR FORMING LEADS OF ELECTRONIC COMPONENTS

[75] Inventor: Franciscus J. A. Storimans, Vandorf, Canada

[73] Assignee: GPD Canada Inc., Gormley, Canada

[21] Appl. No.: 822,635

[22] Filed: Jan. 27, 1986

[51] Int. Cl.⁴ .............................................. B65G 15/14
[52] U.S. Cl. .................................. 198/459; 198/463.6; 198/627
[58] Field of Search ............................... 198/459–461, 198/463.4, 463.6, 627

[56] References Cited

U.S. PATENT DOCUMENTS 3,231,063 1/1966 Talbot .................................. 198/459
3,399,755 9/1968 Bryson et al. ....................... 198/460

Primary Examiner—Andres Kashnikow
Attorney, Agent, or Firm—Fetherstonhaugh & Co.

[57] ABSTRACT

A feed conveyor for a machine for forming the leads of electronic components comprises a pair of conveyor belts which have a forward run extending in a face-to-face relationship. A gaping entrance is formed between the conveyor belts at the upstream end thereof and pinching jaws are provided for gripping the conveyor belts at the entrance and moving conveyor belts toward and away from one another to move the nip which is formed between the belts between a downstream position and an upstream position. A component feeding mechanism is provided for feeding components one at a time into the nip and a drive mechanism is provided for intermittently driving the conveyor belt so that components are gripped between the conveyor belts at uniformly spaced intervals for movement into the working station of the forming mechanism.

4 Claims, 4 Drawing Figures

FEED CONVEYOR FOR MACHINE FOR FORMING LEADS OF ELECTRONIC COMPONENTS

This invention relates to machines for forming the leads of electronic components. In particular, this invention relates to an improved feed conveyor mechanism for feeding loose components to a working station in which the leads of the components are formed and cut to size.

PRIOR ART

After electronic components such as transistors and the like are manufactured, it is common practice to mount them on tape at uniformly spaced intervals for shipping and subsequent handling during shaping and forming. This procedure has the advantage of providing that the components are uniformly spaced from one another so as to be conveniently located for subsequent forming and cutting operations.

The taping of electronic components does, however, have a number of disadvantages. The taping operation adds cost to the product and the tape adds considerable bulk to the product during shipping.

Considerable difficulty has been experienced in attempting to provide a simple and reliable feeder mechanism suitable for use in feeding loose electronic components to the work stations of a forming machine.

SUMMARY OF INVENTION

It is an object of the present invention to provide a simple and reliable feed conveyor mechanism for feeding loose components one at a time, at uniformly spaced intervals, to the working station of a machine for forming the leads of electronic components.

According to one aspect of the present invention, there is provided in a machine for forming the leads of electronic components, a feed conveyor comprising a pair of conveyor belts, support means supporting said belts for movement along a path in which the forward run portions of their length extend in a face-to-face relationship, said forward run portions each including an elongated clamping portion and an entrance portion, said elongated clamping portions extending through a work station and said entrance portions extending through a loading station, said entrance portions converging toward and nip at the input end of said clamping portion and forming a gaping entrance to said nip in said loading station, pinching means engaging said entrance portions of said forward run of said belts, said pinching means being operable to move said entrance portions to and fro between a first position in which the nip is located in a first position downstream of the loading station and said gaping entrance opens into the loading station and a second position in which the nip is located upstream of its first position and the belts are pinched together to clamp a portion of a component therebetween in the loading station for transportation to said component working station, component feeding means for feeding components one at at time to said loading station to be located in said gaping entrance when said pinching means is in said first position, drive means for intermittently driving said conveyor belts through said loading and work station when said pinching means is in said second position, to cause said belts to transport a component which is retained between said belts in said loading station into said working station and to uniformly space successive components on said belts.

Figure 2:
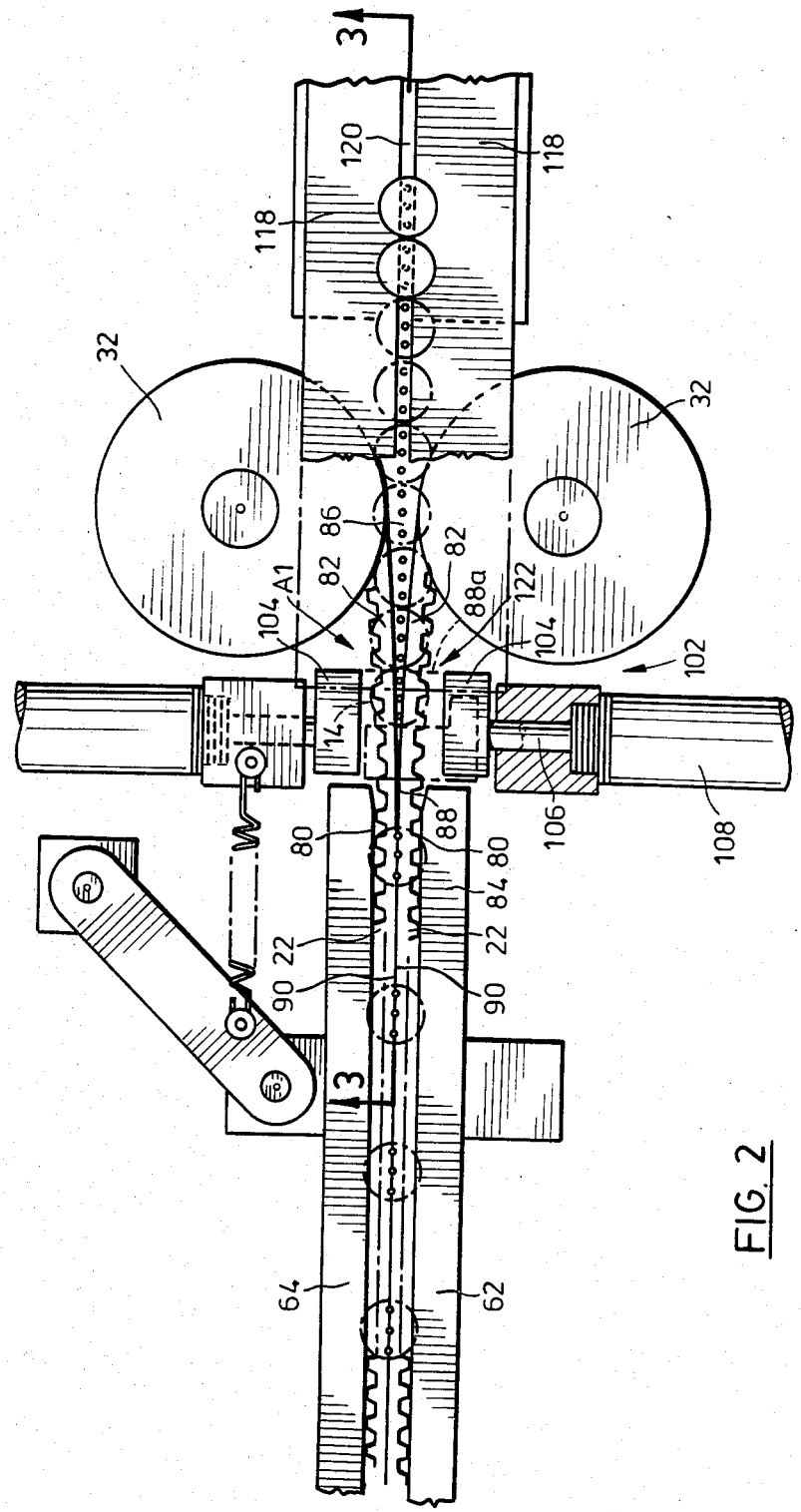
Figure 3:
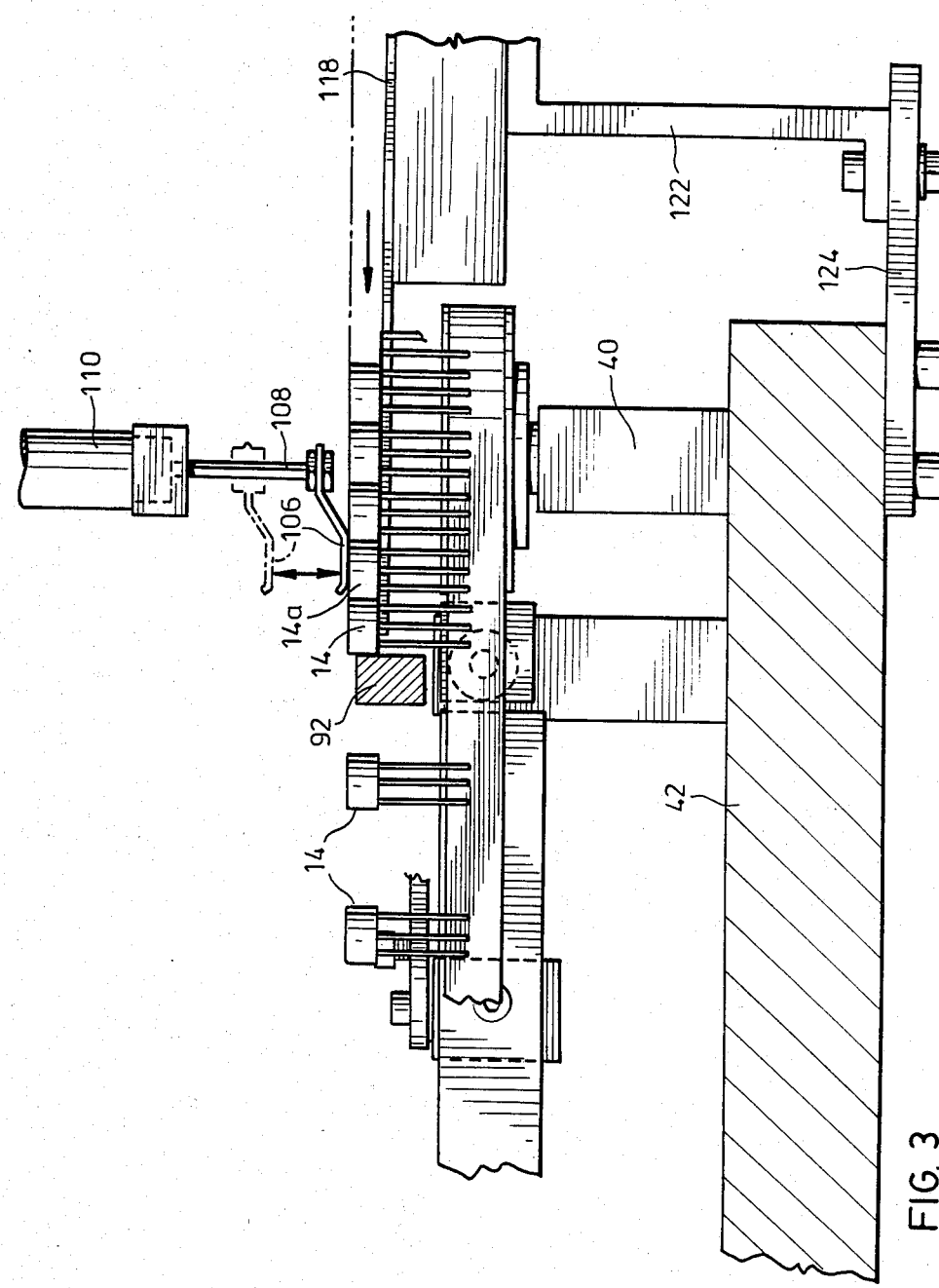
Figure 4:
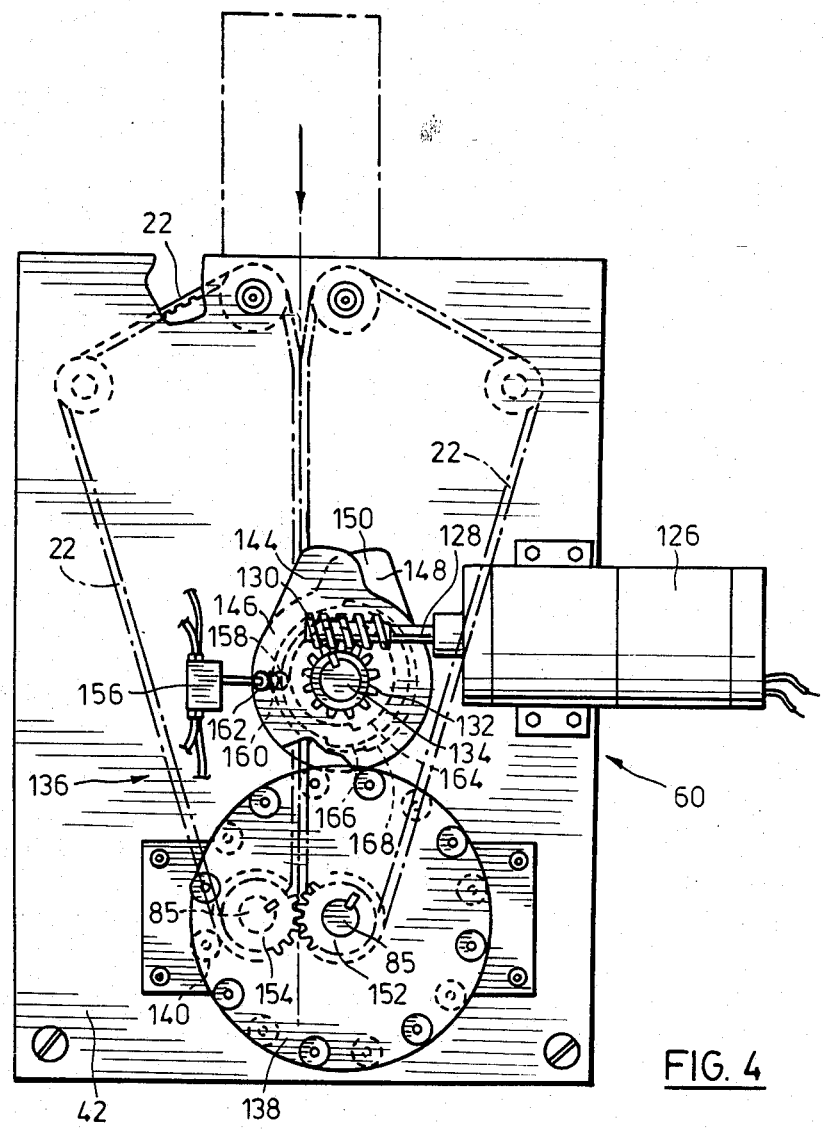

The invention will be more clearly understood after reference to the following detailed specification read in conjunction with the drawings wherein;

FIG. 1 is a pictorial top view of the feed conveyor mechanism of a machine for forming the leads of an electronic component constructed in accordance with an embodiment of the present invention, FIG. 2 is a plan view illustrating the entrance portion of the conveyor, FIG. 3 is a side view taken along the line 3—3 of FIG. 2, FIG. 4 is a diagrammatic plan view of the underside of the mechanism of FIG. 1.

With reference to FIG. 1 of the drawings, the reference numeral 10 refers generally to a machine for forming the leads of electronic components. The reference numeral 12 refers generally to a feed conveyor suitable for use in transporting loose electronic components 14 through a work station 16 in which the leads 18 of the components 14 are formed to the required shape and cut to the required length for subsequent use by working tools located in the areas generally identified by the reference numeral 20. It will be understood that the working tools and the method of operation of the working tools may be conventional and will not therefore be described in detail.

The components 14 are transported through the work station 16 by means of a pair of flexible conveyor belts 22. Each of the conveyor belts 22 have an outer face 24 which is flat and smooth and an inner face 26 formed with a plurality of teeth 28. The conveyor belts 22 are made from a flexible rubber or plastics material which is sufficiently resilient to clamp the leads 18 of components without damaging the leads.

The reference numeral 30 refers generally to the support means for supporting the conveyor belts. The support means 30 for each conveyor belt 22 includes a first sprocket 32, a second sprocket 34 and a third sprocket 36. The first sprocket 32 is mounted for rotation on a shaft 38 which is supported by an upright post 40 (FIG. 3) which is mounted on the base plate 42. The third sprocket 36 is mounted on a shaft 44 which is mounted on an upright post 46 which is mounted on an arm 48. The arm 48 is mounted on the base 42 by means of a releasable clamping screw 50 so that it can rotate about the screw 52, apply tension to and to release the tension from the conveyor belt 22. The sprockets 32 and 36 each have belt retaining end plates 52 and 54 arranged one on either side of the toothed portion 56. The sprockets 34 are driven sprockets which are mounted on a driven shaft 58 which is drivingly connected to the drive means 60 (FIG. 4) as will be described hereinafter.

The support means 30 also includes oppositely disposed guide rails 62 and 64. The guide rail 62 is a fixed guide rail which is mounted on upright posts 66 which are secured to and extend upwardly from the base 42. The guide rail 64 is a moving guide rail which has brackets 68 mounted thereon which are connected by means of link arms 70 to the upper end of upright posts 72. A tension spring 74 has one end connected to the link arm 70 and its other end connected to a fixed upright post 76. The link arms 70 extend in a spaced parallel relationship with respect to one another and are inclined toward the moving guide rail 64 in the direction of travel of the conveyor belts through the work station.

The conveyor belts 23 each have a forward run portion 78 which extends from the first sprocket 32 to the second sprocket 34. The forward run portion 78 includes an elongated clamping portion 80 which extends over the length of the guide rails 62 and 64 and an entrance portion 82 which extends from the sprocket 32 to the upstream end 84 of the guide rails 62, 64. The tension springs 74 serve to urge the moving guide rail 64 toward the fixed guide rail 62 so as to clamp the elongated clamping portions 80 of the conveyor belts 22 against one another with a sufficient force to retain the leads 18 of an electronic component therebetween during movement through the working station.

As shown in FIG. 2 of the drawings when the conveyor belts are free to extend from the upstream ends 84 of the guide rails 62 and 64 to the sprockets 32, a gaping entranceway 86 extends to a nip 88 at which point the oppositely disposed inner faces 90 of the conveyor belts 22 first come in direct face-to-face contact with one another. Upstream of the nip 88, the oppositely disposed faces 90 are arranged in a face-to-face spaced relationship which serves to permit the leads of the leading component 14 to extend into the entranceway to be located in the position A1 shown in FIG. 2 of the drawings.

A barrier plate 92 is mounted on a shaft 94 of a double-act cylinder 96. The cylinder 96 is mounted on a bracket 98 which is mounted on an upright post 100. By activating the cylinder 96, the barrier plate 92 can be moved from the withdrawn position shown in FIG. 1 in which it will permit components to pass along the forward run of the conveyor and a barrier position shown in FIG. 3 and in broken lines in FIG. 2 in which it will prevent movement of the leading component 14.

The clamping of the leads of the leading component 14 between the belts is achieved by causing the nip 88 to move from its first position in shown in FIG. 2 in an upstream direction to the second position 88a. This is achieved by pinching the entrance portions of the conveyor belt. The pinching means is generally identified by the reference numeral 102. The pinching means 102 includes a pair of jaws 104 which are disposed opposite one another and are each mounted on a shaft 106 of a pneumatic cylinder 108 so as to be movable between a retracted position in which they are spaced from the conveyor belts as shown in FIG. 2 and an extended position in which they bear against the conveyor belts 22 and urge the belts toward one another so as to move the nip 88 to the position 88a and thereby firmly clamp at least one of the leads of the leading component 14 therebetween. It will be understood that the extent to which the nip is caused to move between points 88 and 88a may be varied by adjusting the longitudinal extent of the jaw 104.

The component feeding mechanism is generally identified by the reference numeral 112. The component feeding mechanism 112 includes a foot 106 which is mounted on a shaft 108 of a pneumatic cylinder 110. The pneumatic cylinder 110 is supported on an arm 114 which extends from the upper end of a post 116 which is mounted on the base 42. The component feeding mechanism also includes a pair of spaced parallel guide plates 118 which are spaced from one another in an edge-to-edge relationship to form a slipway 120 therebetween. The guide plates 118 are supported by a suitable support structure which includes a leg 122 which is mounted on a bracket 124 which is supported by the base 42. The guide plates 118 extend into the pick-off station 122 so as to provide support for components up to the point at which the leading component is located before it is separated from the single file row of components which are delivered to the pick-off station. For the purposes of advancing the single file row of components along the slipway 122, the guide plates 118 may be downwardly inclined toward the pick-off point and may be caused to vibrate.

The individual components are positioned in the slipway 120 by means of a conventional sorter which is not described herein in detail.

With reference to FIG. 4 of the drawings, it will be seen that the drive means 60 includes a motor 126 which has an output drive shaft 128 upon which a worm gear 130 is mounted. The worm gear 130 is meshed with a worm wheel 132 which is keyed to a shaft 134 which is mounted for rotation in the base 42. For the purposes of providing intermittent longitudinal movement of the conveyors 22, an inverted Geneva mechanism 136 is provided. The inverted Geneva mechanism 136 includes a disc 138 having contact rollers 140 projecting outwardly from opposite faces thereof. The downwardly projecting contact rollers 140 are engaged by the lobe 144 of the Geneva cam 146 and the upwardly projected rollers 140 are engaged by the lobe 148 of the Geneva cam 150. The Geneva plate 138 is keyed directly to the shaft 58 on which the sprocket 34 is mounted. A gear wheel 152 is also mounted on the shaft 85 and meshes with a gear wheel 154 which is keyed to the other shaft 85 so that both conveyor belts 22 are positively driven.

The movement of the jaws 104, foot 106 and the arresting plate 92 are controlled by a pneumatic valve 156 which has actuator rollers 158, 160 and 162 which are arranged to bear against cam faces 164, 166 and 168 respectively. Rotation of the cam 164, 166 and 168 serves to control the timing of the operation of the arresting plate 92, foot 106 and clamping jaws 104.

In use the electronic components 14 are loaded into the hopper of a sorter (not shown) from which they are discharged onto the guide plates 118 with their leads 18 extending through the slipway 120. The guide plates 118 are vibrated to ensure that the components are advanced to the discharge end thereof. Initially, the jaws 104 are spaced apart from one another and out of engagement with the conveyor belts 22 so that the entranceway 86 opens to the nip 88. The arresting plate 92 is initially positioned so as to extend across the path of travel of the components and serves to limit the forward movement of the leading component so that it is retained in the position shown in FIG. 2. Thereafter, the jaws 104 are moved toward one another to pinch the legs of the leading component between the inner faces of the conveyor belts. Simultaneously, the cylinder 110 is activated to cause the foot 106 to be lowered to bear against the component next following the leading component. Thereafter, the arresting plate 92 is withdrawn out of the path of travel of the components. The conveyor belt is then driven to move the leading component from the entrance section of the forward run into the elongated clamping portion in which the belts are retained in clamping engagement with the component by the pressure which is applied between the guide rails 62 and 64. Thereafter, the arresting plate is relocated in a position extending across the path of travel of the components and the jaws 104 are moved away from one another. The foot 106 is then raised to permit the component which was retained thereby to move forward into engagement with the arresting plate to be located in the transferred position and the process is then repeated. By repeating the process, a plurality of components are arranged on the forward run of the belts at uniformly spaced intervals along the length thereof so that they are delivered to the exact location requested by the various working tools located in the work station.

As the components are advanced along the conveyor, they pass through the working station or stations in which one or more forming or cutting operations are carried out on the leads of the component as required and thereafter the component is discharged in a suitable manner.

From the foregoing it will be apparent that the present invention provides a simple and inexpensive form of feed conveyor mechanism which is capable of receiving loose electronic components and spacing the components from one another and conveying the components through a work station in a spaced relationship. These and other advantages of the mechanism of the present invention will be apparent to those skilled in the art.

I claim:

1. In a machine for forming the leads of electronic components, a feed conveyor comprising;
   (a) a pair of conveyor belts,
   (b) support means supporting said belts for movement along a path in which the forward run portions of their length extend in a face-to-face relationship, said forward run portions each including an elongated clamping portion and an entrance portion, said elongated clamping portions extending through a work station and said entrance portions extending through a loading station, said entrance portions converging toward a nip at the input end of said clamping portion and forming a gaping entrance to said nip in said loading station,
   (c) pinching means engaging said entrance portions of said forward run of said belts, said pinching means being operable to move said entrance portions to and fro between a first position in which the nip is located in a first position downstream of the loading station and said gaping entrance opens into the loading station and a second position in which the nip is located upstream of its first position and the belts are pinched together to clamp a portion of a component therebetween in the loading station for transportation to said component working station,
   (d) component feeding means for feeding components one at at time to said loading station to be located in said gaping entrance when said pinching means is in said first position,
   (e) drive means for intermittently driving said conveyor belts through said loading and work station when said pinching means is in said second position, to cause said belts to transport a component which is retained between said belts in said loading station into said working station.

2. A machine as claimed in claim 1, wherein said pinching means comprises;
   (a) a pair of jaws located in said loading station and arranged opposite one another, one on either side of said path for engagement one with each belt, and
   (b) clamping drive means engaging said jaws and operable to move said jaws to and fro to move said belts between said first and second positions and thereby move said nip out of and into said loading station.

3. A machine as claimed in claim 1, wherein said support means comprises;
   (a) a pair of guide rails arranged in a spaced parallel relationship one on either side of said path along the length of said elongated clamping portion, and
   (b) a pair of guide rollers arranged one on either side of said path and spaced forwardly and laterally from the guide rails to support the belts in a position in which they converge toward the guide rails as aforesaid.

4. A machine as claimed in claim 1, wherein said component feeding means comprises;
   (a) a slipway for guiding said electronic components in a single file into said loading station, said slipway having a discharge end opening into said loading station,
   (b) stop means mounted for movement into and out of said path at said loading station to releaseably arrest the forward movement of the leading component of the single file of components at said loading station,
   (c) retaining means for retaining the component next following the leading component in a fixed position with respect to said slipway when the stop means is moved out of the path of the components whereby only the leading component is discharged from the slipway into the loading station for engagement with the belts by operation of the pinching means.

* * * * *